United States Patent
Schemers et al.

(10) Patent No.: US 6,751,453 B2
(45) Date of Patent: Jun. 15, 2004

(54) SEAMLESS MESSAGE RETRIEVAL AND TRANSMITTAL DURING WIRELESS APPLICATION PROTOCOL SESSION

(75) Inventors: Roland Schemers, Redwood City, CA (US); Kevin Kluge, Mountain View, CA (US)

(73) Assignee: Openwave Systems, Inc., Redwood City, CA (US)

(*) Notice: Subject to any disclaimer, the term of this patent is extended or adjusted under 35 U.S.C. 154(b) by 19 days.

(21) Appl. No.: 09/797,167

(22) Filed: Feb. 27, 2001

(65) Prior Publication Data

US 2002/0097850 A1 Jul. 25, 2002

Related U.S. Application Data

(60) Provisional application No. 60/263,859, filed on Jan. 23, 2001.

(51) Int. Cl.[7] .................. H04M 11/10; H04M 11/00; H04M 1/64
(52) U.S. Cl. ............ 455/412; 455/413; 379/88.14; 379/88.17; 379/88.18
(58) Field of Search .................. 455/412, 413, 455/466, 414, 418, 419, 420, 426; 709/246, 206; 379/67.1, 88.11, 88.12, 88.13, 88.14, 88.17, 88.18, 88.22, 88.25

(56) References Cited

U.S. PATENT DOCUMENTS

| | | | | |
|---|---|---|---|---|
| 6,343,329 | B1 * | 1/2002 | Landgraf et al. | 455/413 |
| 2001/0027097 | A1 * | 10/2001 | I'Anson | 455/412 |
| 2001/0029176 | A1 * | 10/2001 | Taniguchi | 455/413 |
| 2002/0055350 | A1 * | 5/2002 | Grupte et al. | 455/412 |
| 2002/0098831 | A1 * | 7/2002 | Castell et al. | 455/413 |

FOREIGN PATENT DOCUMENTS

| | | |
|---|---|---|
| WO | WO 0003554 | 1/2000 |
| WO | WO 0054488 | 9/2000 |
| WO | WO 0059196 | 10/2000 |

OTHER PUBLICATIONS

Erlandson et al. "WAP–The Wireless Application Protocol", on—Ericsson Review, Ericsson Stockholm, SE, No. 4, 1998, pp. 150–153, XP000792053, ISSN: 0014–0171.

* cited by examiner

*Primary Examiner*—Nay Maung
*Assistant Examiner*—Raymond Persino
(74) *Attorney, Agent, or Firm*—Baker & McKenzie

(57) ABSTRACT

A system, method, and apparatus for seamless message retrieval during a data session at a mobile station is presented herein. While viewing information related to messages stored for the subscriber, the subscriber can select a particular message for listening to or responding to by voice. Responsive thereto, a record indicating the selected action and any selected message is stored in a state server, the data session is automatically terminated, and a phone call is placed to a telephony server. Upon completion of the phone call, the telephony server determines the action and selected message by querying the state server. The state server returns an operation code and an identifier identifying any selected voice message. The telephony server then performs the indicated operation. Wherein the operation is to play the selected message, the telephony server plays the selected message. Wherein the operation is to respond to an email by voice, the telephony server records a voice message from the subscriber.

16 Claims, 7 Drawing Sheets

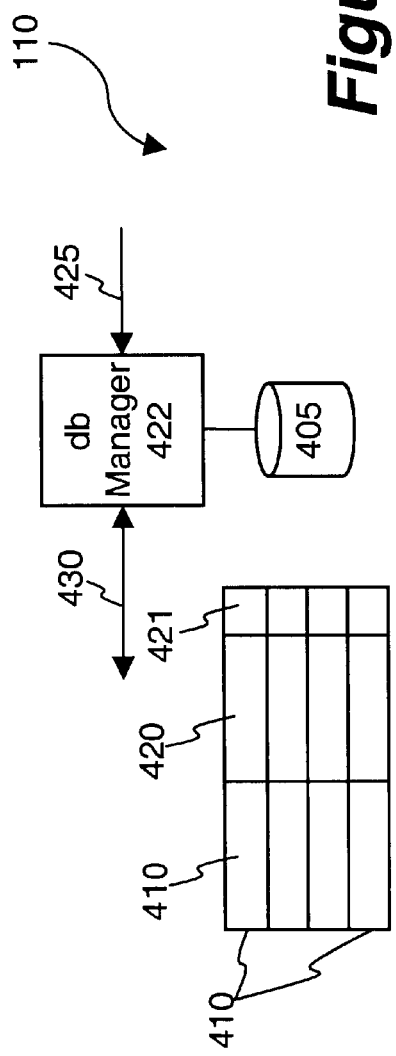

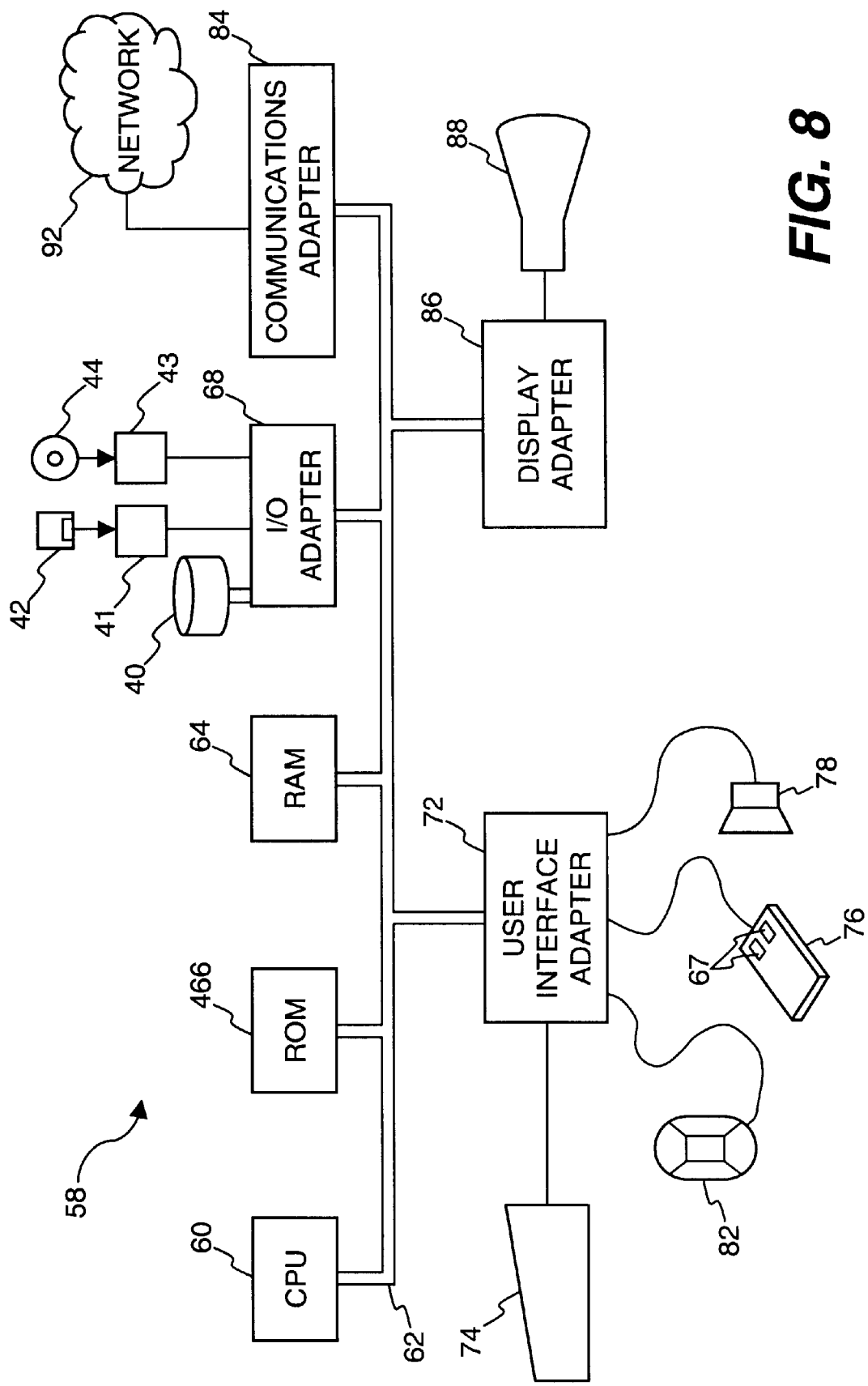

SEAMLESS MESSAGE RETRIEVAL AND TRANSMITTAL DURING WIRELESS APPLICATION PROTOCOL SESSION

The instant patent application claims priority from the U.S. provisional application assigned with Serial No. 60/263,859 entitled "Seamless Voicemail Message Retrieval during Wireless Application Protocol Session", naming Roland Schemers and Kevin Kluge as inventors, which was filed on Jan. 23, 2001, and is hereby incorporated by reference for all purposes.

TECHNICAL FIELD

This application is related to voicemail systems, and more particularly, to retrieving voicemail messages during a Wireless Application Protocol session.

BACKGROUND

The emergence of wireless cellular phone technology, as well as advances in portable computing now allow wireless access to the Internet. The computer functionality is integrated into the cellular phone handset, thereby providing the cellular phone with the ability to browse and display wireless markup language (WML) or hypertext device markup language web pages. The wireless capabilities of the cellular phone are used to access the Internet.

The Wireless Application Protocol (WAP) is a standard developed for wireless internet access on cellular telephones, and other wireless terminals. The internet is a worldwide network linking computers from educational institutions, the military, government agencies, and businesses and has been dubbed the "Information Superhighway". In addition to email and displaying data and graphics, recent advances allow for the transfer of audio signals, such as voice transmissions, over the internet. Such voice transmissions can include voice messages.

Transmission of email and voice messages over the Internet make possible a unified messaging system, wherein users can access email and voice messages from the internet. For example, a subscriber can be associated with a phone number/extension. A calling party can leave a message for the subscriber by either calling the phone number and leaving the message or sending an email addressed to the email address to the email address. Wherein the sender calls the phone number/extension, the messaging system can digitize the messages and build the transmission protocol for transmission of the messages over the Internet. Wherein the sender uses the email address, a voice message by the sender can be recorded and sent as an attachment file such as a *.wav file.

Retrieval of voice messages over the internet is advantageous for several reasons. Voice messages have been traditionally accessed by establishment of a phone call using the Public Switched Telephone Network (PSTN). Establishment of a phone call requires allocation of a voice circuit for the duration of the message retrieval and can also result in toll charges. In contrast, transfer of voice messages over the internet involves a packet data transmission with no associated toll charges.

When retrieving messages, the subscriber accesses a predetermined web site, and provides identification information. Responsive thereto, a graphical user interface indicating the messages stored for the subscriber can be displayed. For example, the graphical user interface can include information about each message, such as the time the message was left, the length, the caller, etc. The user can then select a message for retrieval. Wherein the user is connected to the Internet with a wireline connection, the voice message is transferred and played for the user, responsive to such selection.

However, wherein the user accesses the internet using a WAP session, the voicemail message cannot be transferred because WAP, as of the date of application, does not include specifications for the transfer of voice messages. Accordingly, while notified of stored messages during a WAP session, the subscriber must terminate the WAP session, and call the messaging system to listen to their messages. After completing the call, the user must often provide identification information, such as a userid and password. After identifying themselves, the user must then listen to a menu of choices to hear their messages. In some cases, the user must listen to the messages in chronological order. Upon completion of the retrieval of voice messages, the user must then reestablish the WAP session. The foregoing requires a considerable amount of user interaction.

Accordingly, it would be beneficial if the requisite user interaction could be minimized.

SUMMARY

Presented herein are systems, methods, and apparatus for seamless message retrieval during a wireless application protocol session.

A technique for retrieving messages is presented wherein a web page is displayed at a mobile station which provides indicators associated with messages which are stored for the subscriber. Upon receiving a selection of a particular message indicator, a call is automatically placed from the mobile station to a telephony server.

A technique for transmitting a voice message to a mobile station is also presented, wherein responsive to receipt of a phone call from a mobile station, a state server is queried.

A voice messaging system for delivering messages is also presented. The voice messaging system includes a web server which displays a web page. The web page displays indicators associated with messages and receives a selection of a particular indicators from a mobile station. The voice messaging system also includes a telephony server which receives an incoming phone call from the mobile station responsive to selection of the indicator.

BRIEF DESCRIPTION OF THE DRAWINGS

FIG. 3 is a block diagram describing an exemplary graphical user interface;

FIG. 4 is a block diagram describing an exemplary state server;

FIG. 8 is a block diagram of an exemplary computer information handling system.

DETAILED DESCRIPTION

Figure 1:
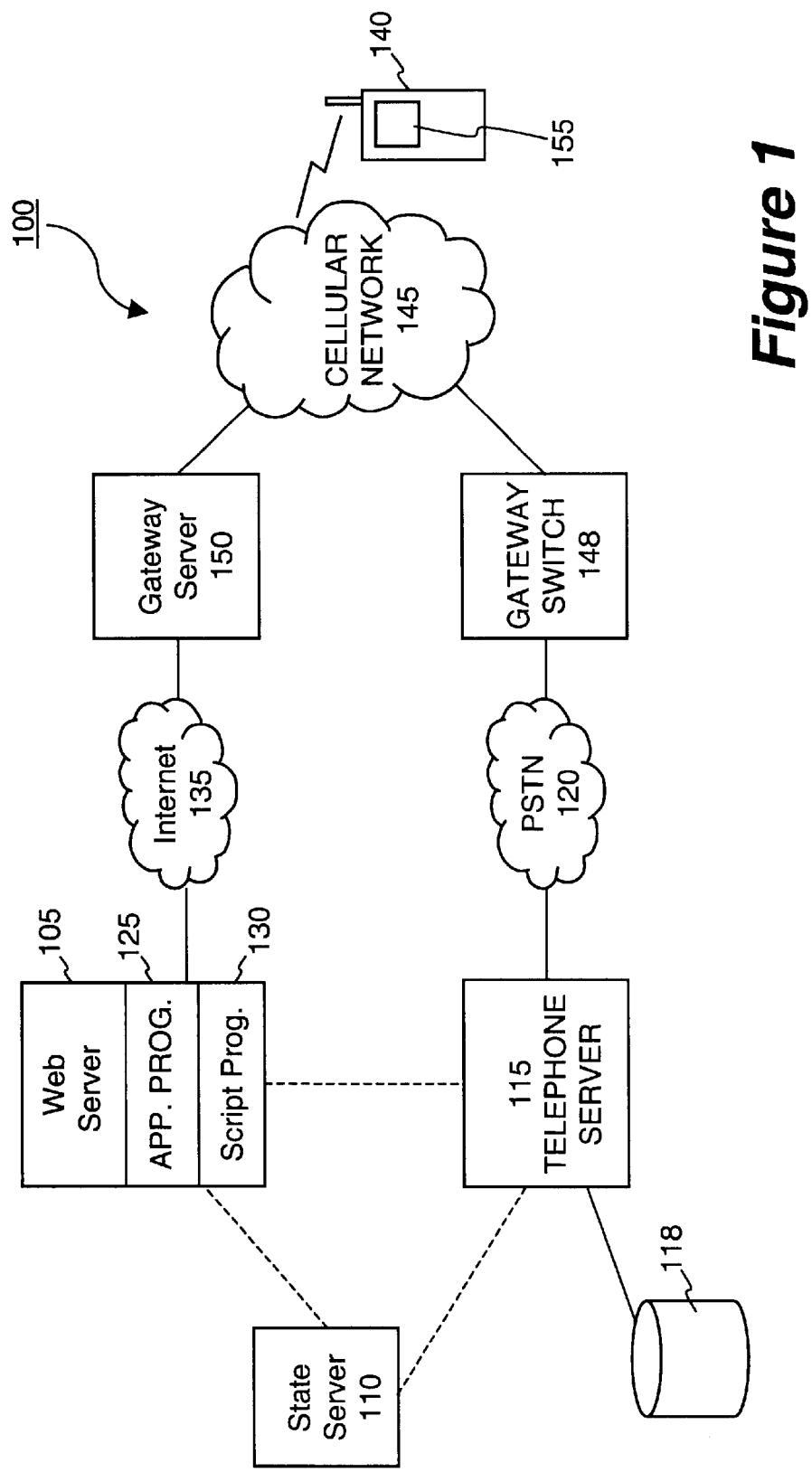
FIG. 1 is a block diagram of an exemplary messaging system.

Referring now to FIG. 1, there is illustrated a block diagram describing a messaging system 100. The voicemail messaging system 100 includes a web server 105, a state server 110, and a telephony server 115. The web server 105 is connected to a packet switched network, such as the Internet 135, while the telephony server 115 is connected to a public switched telephone network (PSTN) 120.

The telephony server 115 controls access to a message store 118 which stores voice messages and related information for any number of subscribers. The related information can include, e.g., the recipient, sender information, time the message was left, and the length of the message. Each subscriber can be associated with a particular phone number and/or extension wherein others can leave voice messages for the subscriber by calling the phone number/extension. The telephony server 115 receives the phone call, prompts the caller to leave their message, and digitizes and stores the message in the message store 118.

The subscriber can listen to the recorded voice messages by establishing a phone call to the telephony server 115 over the public switched telephone network 120. Upon completion of the phone call, the telephony server 115 validates the identity of the subscriber and allows the subscriber to hear the messages stored in the message store.

The telephony server 115 is connected to a state server 110 which stores information identifying the particular message to be played by the telephony server 115. The state server 110 permits automatic playback of a specific voice message from a plurality of voice messages which may be stored at the message store 118 for the subscriber, by storing records which include subscriber information, telephone number associated with subscribers, and identifiers identifying selected recorded voice messages. When a phone call is placed to the telephony server 115, the telephony server 115 determines the phone number of the calling party, and queries the state server 110 for voice message associated therewith. The state server 110 identifies the voice message for retrieval. Responsive thereto, the telephony server 115 retrieves the voice message from the message from the message store 118 and plays the identified voice message. It is noted that the foregoing process requires only placement of the phone call and no additional inputs from the subscriber.

The web server 105 is a computer system which allows subscribers to view the information related to voice messages stored for a particular subscriber. The web server 105 is capable of querying the telephony server 115 by an application program 125. The application program 125 can query the telephony server 115 for information related to each voice message stored for a particular subscriber. The application program 125 can also select a particular recorded voice message and have the state server 110 create a record with the recorded voice message and corresponding subscriber's telephone number. The particular subscriber and the particular message selected are received by the application program 125 as inputs. Additionally, the web server 105 can provide email service to the subscribers.

The web server 105 is accessible over a packet network 135 by establishment of a client/server connection. Wherein a client/server connection is established, a script program 130 at the web server 105 defines a number of objects forming a graphical user interface (GUI) for display at the client terminal. The GUI facilitates entry of inputs from the client terminal and the display of outputs from the web server 105 at the client terminal. The inputs provided by the client terminal can include data which identifies the user, e.g., a userid, password, or personal identification number. Wherein the web server 105 provides email service to the subscriber, the emails received for the identified subscriber are retrieved from the web server 105. The identification data is provided to the application program which then queries the telephony server 115 for voice messages stored for the subscriber. The resulting email and voice message information is provided to the script program which defines objects for the display of the email and voice message information in the graphical user interface.

Mobile station 140 can access the PSTN and the Internet via a cellular network 145. The cellular network 145 provides radio transmission and coverage between the mobile station 140 and the PSTN 120 and internet 135. The cellular network 145 is connected to the PSTN 120 via a gateway switch 148, and is connected to the Internet via a gateway server 150.

The mobile station 140 accesses the internet 135 by establishing a session with the gateway server 150. The gateway server 150 serves as a proxy for the receipt and transmission of all data over the internet 135. The gateway server 150 and web servers, such as web server 105 communicate pursuant to protocols such as Transport Control Protocol (TCP), IP, and hypertext transmission protocol (http). The gateway server 150 conducts data communications with the mobile station 140 over the wireless network 135 using a protocol known as the Wireless Application Protocol (WAP).

A subscriber can access information regarding stored voice and email messages by establishing a WAP session with the gateway server 150 and accessing web server 105. Upon accessing web server 105, the script program 130 provides a number of objects for displaying information at mobile station 140. The foregoing objects are received by a program in the mobile station 140 known as a browser 155 which generates the GUI with the objects at the mobile station.

Figure 2:
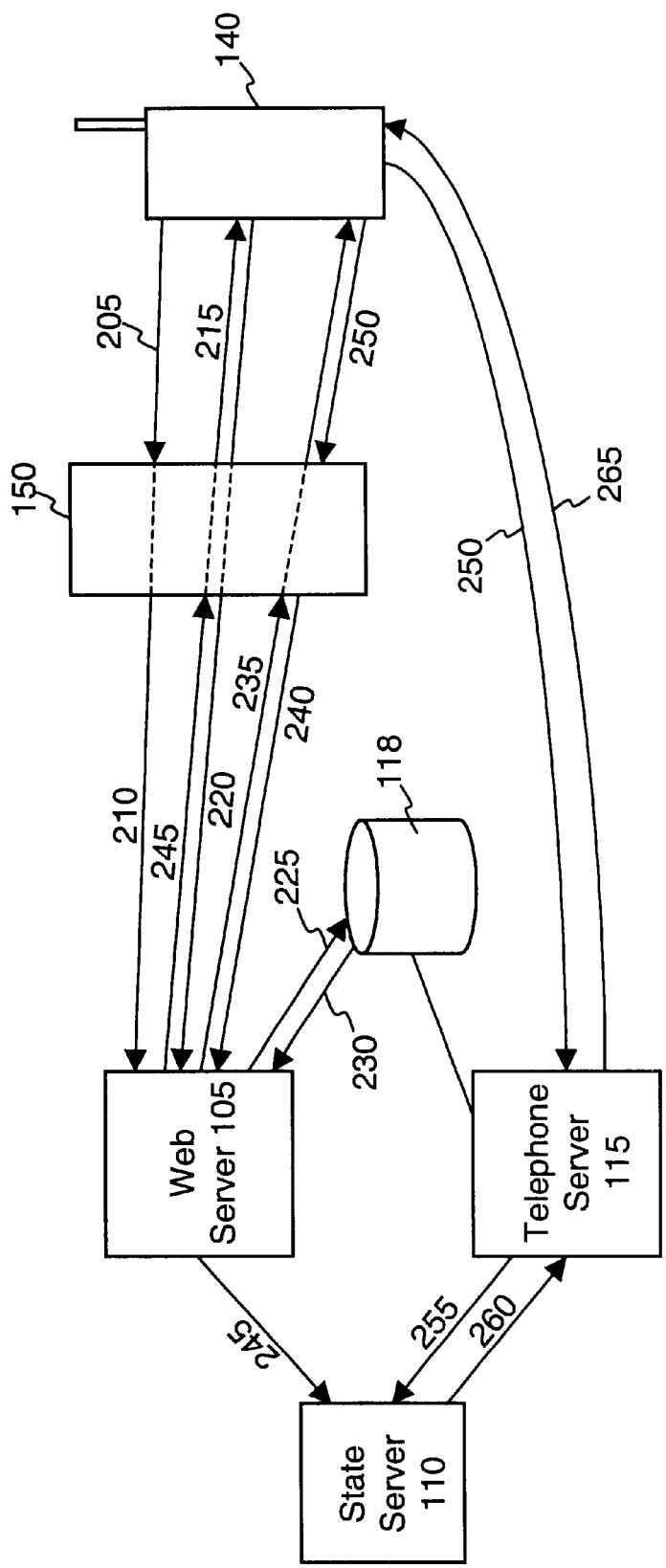
FIG. 2 is a signal flow diagram describing the operation of the messaging system.

Referring now to FIG. 2, there is illustrated a signal flow diagram describing the seamless voice message retrieval. The operation of the voice messaging system will be described with reference to FIGS. 3–5. A wireless application protocol (WAP) session is established with the gateway server 150 (signal 205). Upon establishing the WAP session, a client/server connection is established between the mobile station 140 and the web server 105 with the gateway server 150 acting as a proxy client (signal 210). Those skilled in the art will recognize that the client/server connection can be established by entering an IP address associated with the web server 105 at the mobile station 140. Upon establishment of the client/server connection, the script program 130 at the web server 105 sends a number of objects for display at the mobile station 140 in a graphical user interface (signal 215). At the graphical user interface, the mobile station 140 transmits certain subscriber identification information, such as a userid and associated password (signal 220) to the web server 105. Responsive thereto, the application program 125 at the web server 105 queries the message store 118 for information relating to any voice messages stored for the subscriber at the message store 118 (signal 225). Responsive thereto, the message store 118 transmits the information relating to any messages stored for the subscriber to the web server 105 (signal 230). Wherein the web server 105 provides email service, the web server 105 also retrieves emails stored therein for the subscriber. The script program 130 then defines a number of objects for displaying the information relating to the stored voice and email messages for the subscriber and transmits the objects to the mobile station 140 (signal 235). The objects are received at the mobile station 140 and displayed in a graphical user interface created by the browser program 155 therein.

Referring now to FIG. 3, there is illustrated a block diagram describing an exemplary graphical user interface (GUI) 300 for displaying information relating to stored messages. The GUI 300 can comprise what is known as a web page and includes a list of call indicators 305 and email indicators 308. The call indicators 305 can include such information as the phone number of the party leaving the message, the time of the message, and the duration of the message. The email indicators 308 can include the email address of the sending party, and the time of the message. Associated with each call indicator 305 is a listen to message object 310 which indicates that the user wishes to listen to the voice message. Associated with each email indicator 308 is a respond to email by voice object 312. The listen to message object 310 and respond to email by voice object 312 can comprise, for example, a hyperlink, or a button, and are selectable using the handset of the mobile station 140.

Referring again to FIG. 2, when the subscriber selects a particular listen to message object, the script program 130 causes an object indicating the particular listen to object selected to be transmitted (signal 240) to the web server 105. The operation of the script program 130 will be described below. Upon receiving the object, the web server 105 transmits the mobile station 140 phone number and an indicator indicating the particular voice message associated with the selected listen to object and an indicator indicating the listen to message action selected by the user subscriber to the state server 110 (signal 245).

Referring now to FIG. 4, there is illustrated a block diagram describing an exemplary state server 110. The state server 110 includes a database 405 for storing records 410. The records 410 include subscriber phone numbers 415 subscriber profile and authentication data 417 associated voice message identifiers 420 which identify particular voice messages stored at the message store 118 and an operation code 421. The operation code 421 indicates the particular action selected by the subscriber, for example, listen to message, reply to message, reply to email by voice, and forward message, to name a few. Wherein the subscriber selects the listen to message object, the operation codes indicates that the subscriber wishes to hear the identified message. The state server 110 also includes a database manager 422 which stores a record responsive to an input signal received from the web server 105 at input port 425 which includes the subscriber phone number and the voice message identifier.

The state server 110 can also receive queries from the telephony server 115 at port 430 which include subscriber phone numbers. Responsive to receipt of a query, the database manager 425 searches the records 410 and returns the voice message identifier 420 and operation code 421 associated with the subscriber phone number over port 430.

Figure 5:
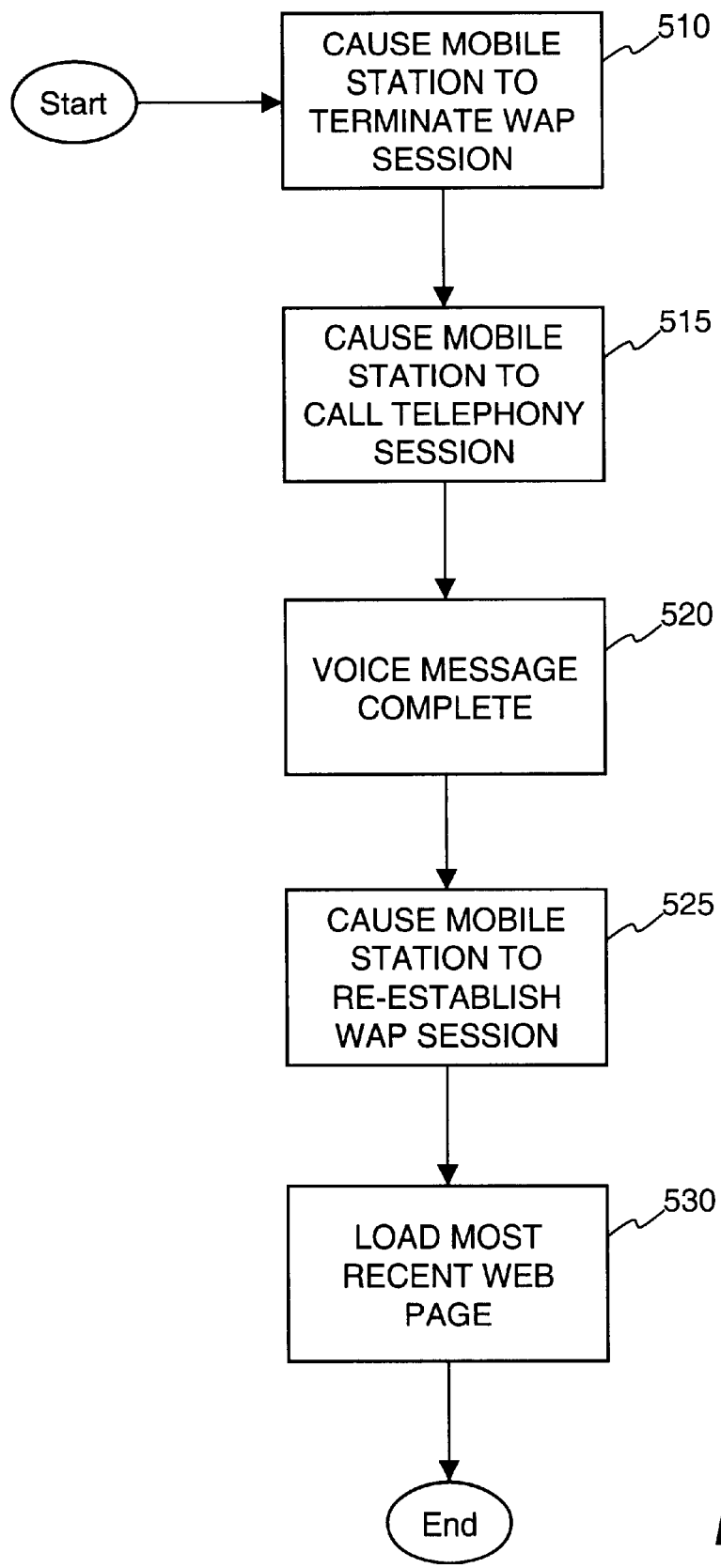
FIG. 5 is a flow diagram describing the operation of a listen to voice message applet.

Referring now to FIG. 5, there is illustrated a flow diagram describing the operation of the script program 130 responsive to selection of listen to message object 310. At step 510, the script program 130 causes the mobile station 140 to terminate the WAP session with the gateway server 150. After termination of the WAP session, the applet 130a causes the mobile station 140 to dial the telephone number associated with the telephony server 115 (step 515). The foregoing establishes a telephone connection, therebetween, during which the selected voice message is played.

Referring again to FIG. 2, responsive to receiving the incoming phone call from the mobile station 140 at the telephony server (signal 250), the telephony server 115 determines the phone number of the mobile station 140. Those skilled in the art will recognize that during the establishment of a telephone call, the calling party telephone number is transmitted to the telephony server 115. The calling party telephone number is then used by the telephony server 115 to query (signal 255) the state server 110. The state server 110 retrieves the record 410 stored when the subscriber selected the listen to message object, and forwards (signal 260) the voice message identifier 420 and operation code 421 to the telephony server 115. The telephony server 115 receives the operation code 421 and message identifier. Receipt of the message identifier and operation code 421 cause the telephony server 115 to perform the operation described in the operation code with the message identifier. Wherein the operation code 421 indicates to play the message, the telephony server 115 retrieves the voice message associated therewith, and plays the voice message for the user (signal 265). It is noted that after hearing subscriber to hear the voice message, the subscriber can also be permitted to either reply with a voice message, or forward the voice message to another party with a narrative voice message from the subscriber. The foregoing can be effectuated by an appropriate menu of voice message handling options by the telephony server.

Referring again to FIG. 5, after completion of the voice message and termination of the phone call (step 520), the script program 130 causes the mobile station 140 to reestablish a WAP session (step 525) with the gateway server 150 and the most recently viewed web page is loaded into the browser 155 (step 530).

The foregoing demonstrate seamless voice message retrieval while viewing the voice message information from a mobile station 140. Additionally, the subscriber can also view and respond to emails in a seamless manner by selecting the respond to email by voice object 312.

Figure 6:
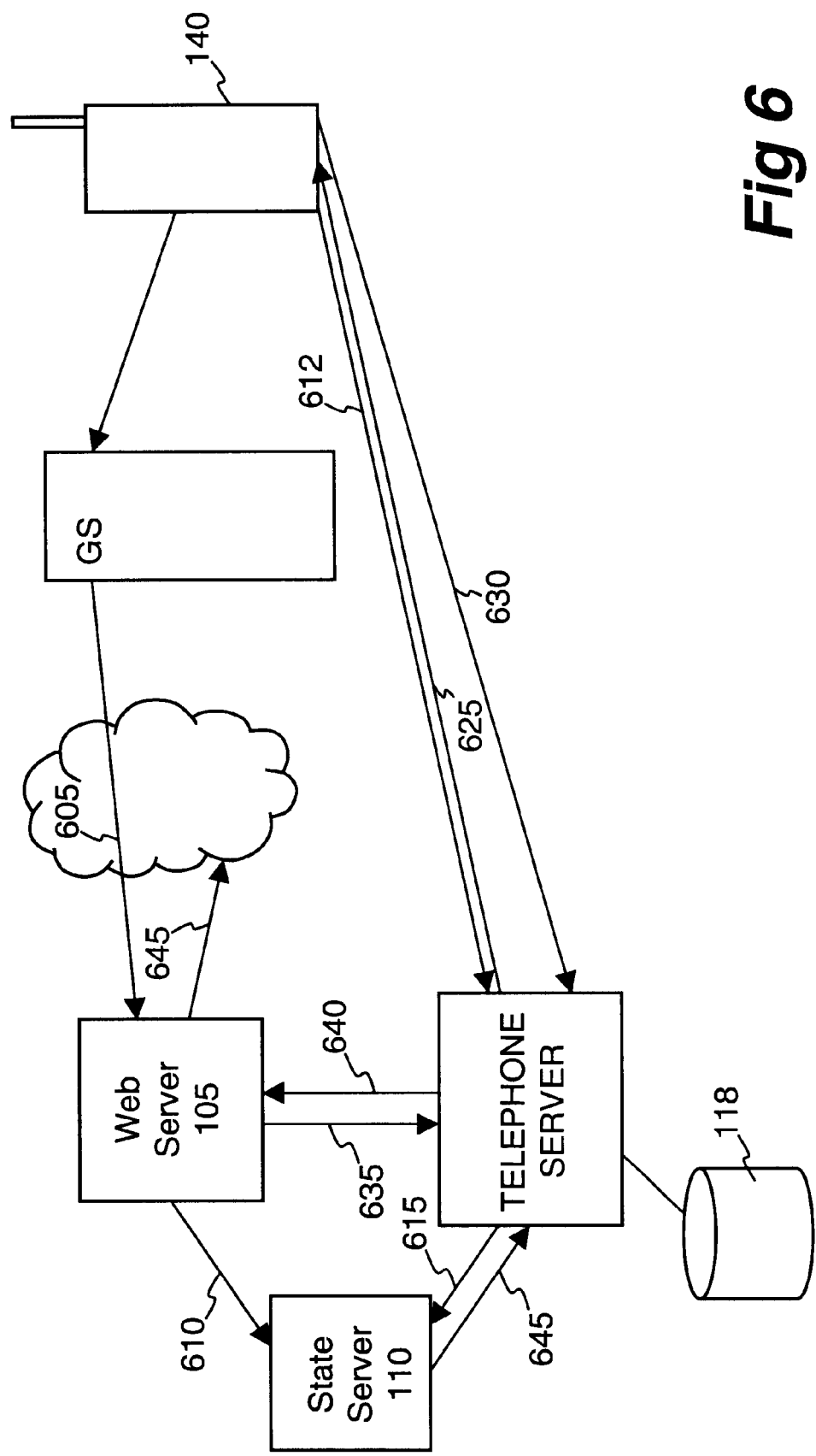
FIG. 6 is signal flow diagram describing seamless voice response to an email.

Referring now to FIG. 6, there is illustrated a signal flow diagram describing the operation of the messaging system 100 responsive to selection of the response to email by voice object 312. When the response to email by voice object 312 is selected, an object indicating selection of the response to email by voice object 312 is transmitted to the web server 105 (signal 605). The operation of the script program 130 responsive to selection of the respond to email by voice object is described below in FIG. 7. The web server 105 prepares an email and transmits the phone number of the mobile station 140 and an indicator indicating a response to email by voice action to the state server 110 (signal 610). The state server 110 stores a record 410 with the foregoing phone number and an operation code indicating response to email by voice.

Figure 7:
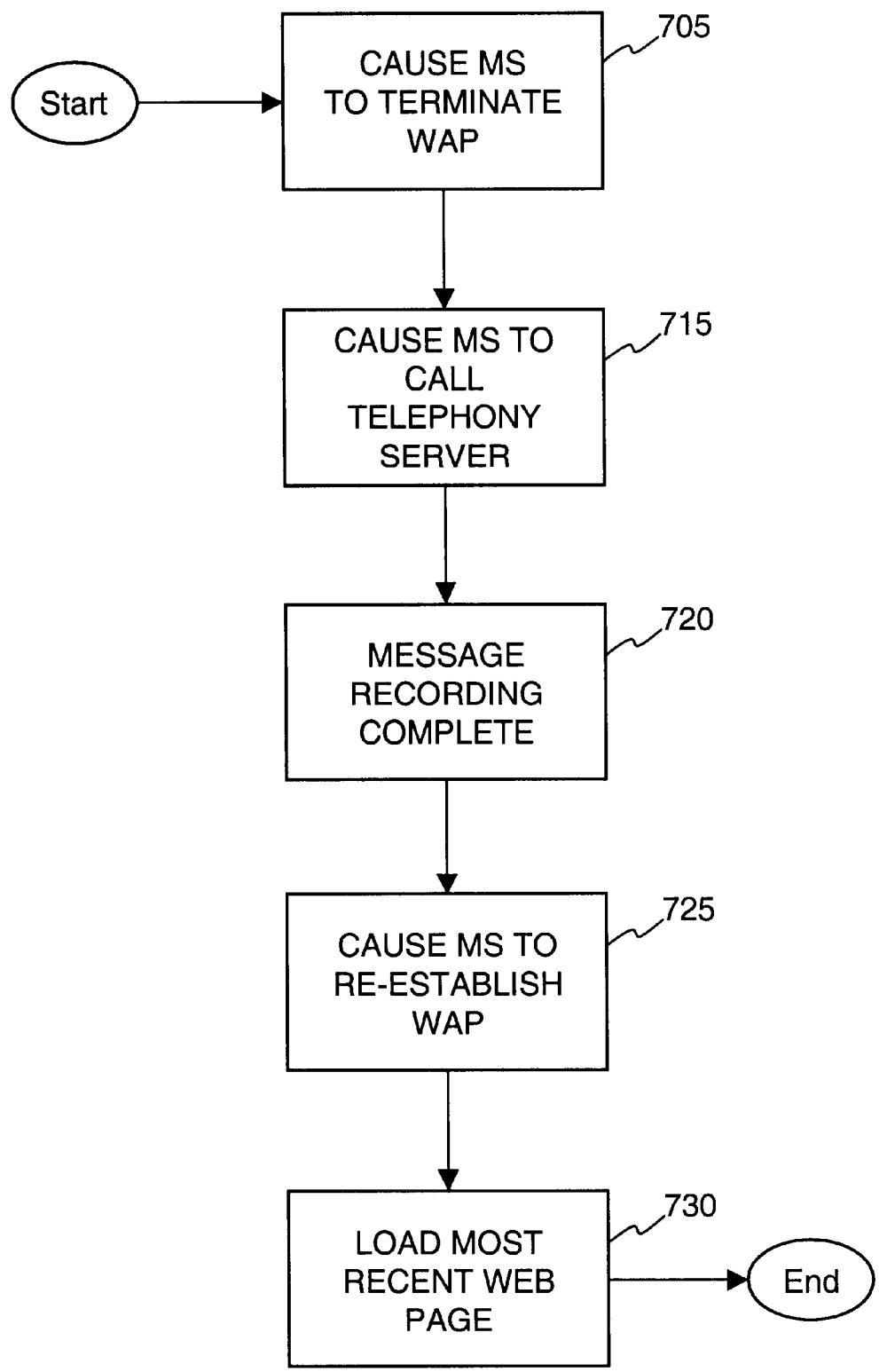
FIG. 7 is a flow diagram describing the operation of a respond to email by voice applet.

Referring now to FIG. 7, there is illustrated a flow diagram describing the operation of the script program 130 responsive to selection of the respond to email by voice object. At step 705, the respond to email by voice applet 130b causes the mobile station 140 to terminate the WAP session with the gateway server 150. After termination of the WAP session, the script program 130 causes the mobile station 140 to dial the telephone number associated with the telephony server 115 (step 715). The foregoing establishes a telephone connection, therebetween, during which the subscriber records a voice message.

Referring again to FIG. 6, upon completion of the telephone call (signal 612) to the telephony server 115, the telephony server 115 retrieves the phone number associated with the mobile station 140 and queries the state server 110 (signal 615). Responsive thereto, the state server 110 returns the respond to email by voice, operation code 421 (signal 620). Upon receipt of the response to email by voice operation code 421, the telephony server 115 prompts the subscriber to record a message (signal 625). As the subscriber leaves the message (signal 630), the telephony server 115 records and stores the message in a predetermined computer file format such as a *.wav file. After the subscriber has completed the message, the web server 105 queries the telephony server 115 (signal 635) for the recorded message. The query can be sent at predetermined time intervals from the selection of the respond to email by voice object 312. The telephony server 115 responds to the query returning the file (signal 640) to the web server 105. The web server 105 then attaches the file to the email and sends the email over the internet (signal 645).

Referring again to FIG. 7, after completion of the voice message recording and termination of the phone call (step 720), the script program 130 causes the mobile station 140 to reestablish a WAP session (step 725) with the gateway server 150 and the most recently viewed web page is loaded into the browser 155 (step 730).

Although the foregoing demonstrates response to email by voice, it is noted that a voice email message can also be composed for an email recipient provided by the subscriber. The subscriber can indicate a function for creating a new email, provide the addressee and indicate a voice message for attachment. Upon indicating the voice message for attachment, the message system 100 operates as described above to send the email.

Referring now to FIG. 8, a representative hardware environment for practicing the present invention is depicted and illustrates a typical hardware configuration of a computer information handling system 58 in accordance with the subject invention, having at least one central processing unit (CPU) 60. CPU 60 is interconnected via system bus 12 to random access memory (RAM) 64, read only memory (ROM) 66, and input/output (I/O) adapter 68 for connecting peripheral devices such as disc units 70 and tape drives 90 to bus 62, user interface adapter 72 for connecting keyboard 74, mouse 76 having button 67, speaker 78, microphone 82, and/or other user interfaced devices such as a touch screen device (not shown) to bus 62, communication adapter 84 for connecting the information handling system to a data processing network 92, and display adapter 86 for connecting bus 62 to display device 88.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 64 of one or more computer systems configured generally as described in FIG. 8. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information.

It should be understood that the innovative concepts described in the present application can be modified and varied over a wide range of applications. For example, although embodiments are described with the wireless application protocol (WAP), it should be understood that other embodiments may use other standards and protocols for the wireless transfer of data. Accordingly, the scope of the present invention is not limited to any of the specific exemplary teachings discussed, but is only limited by the following claims and equivalents thereof.

What is claimed is:

1. A method for providing messaging services comprising:

providing a page for display at a mobile station, said page including at least one object associated with a messaging service;

receiving a selection of a particular object from the mobile station, wherein said particular object corresponds to a messaging service to be performed for a particular message;

storing a mobile station number, an operation code corresponding to the selected messaging service, and a message identifier corresponding to the selected message in a state server;

receiving an incoming phone call from a mobile station, responsive to receiving a selection of the particular object;

querying the state server, responsive to receiving the incoming phone call, to retrieve the operation code and the message identifier corresponding to the mobile station number from the state server;

providing the requested messaging service to the mobile station through the telephonic connection.

2. The method of claim 1, wherein the messaging service comprises:

playing a voice message to the mobile station.

3. The method of claim 1, wherein the messaging service comprises:

recording a voice message from the mobile station.

4. The method of claim 1, wherein the messaging service comprises providing a vocalized version of an e-mail message to the mobile station.

5. The method of claim 1, wherein the messaging service comprises sending a voice message to a voice-mail address from the mobile station.

6. The method of claim 1, wherein querying the state server further comprises transmitting a number corresponding to the phone number of the mobile station.

7. The method of claim 1, wherein querying the state server further comprises:

transmitting a phone number associated with the mobile station.

8. The method of claim 1, wherein the messaging service comprises sending a voice message to an e-mail address from the mobile station.

9. The method according to claim 8, further comprising:

receiving an e-mail address from the mobile station;

attaching the recorded voice message to an e-mail; and sending the e-mail with the recorded message to the e-mail address.

10. The method of claim 1, further comprising:

causing a packet data session with the mobile station to be terminated, responsive to receipt of the selection.

11. The method of claim 10, further comprising:

causing the packet data session with the mobile station to be reestablished responsive to completion of the messaging service.

12. The method of claim 11, wherein the packet data session comprises a Wireless Application Protocol session.

13. A messaging system for providing messaging services, said messaging system comprising:
- a web server for providing a page, wherein the page comprises at least one object associated with a messaging service, the web server further operable for receiving a selection of a particular one of the objects from a mobile station; and
- a state server operable to store a record in response to receiving a selection of an object from a mobile station, wherein the record comprises a mobile station number, an operation code corresponding to a selected messaging service, and a message identifier corresponding to a selected message, wherein the state server is further operable to receive a query comprising a mobile station number and transmit a corresponding operation code and message identifier;
- a telephony server for receiving a phone call from the mobile station, wherein the telephony server is operable to transmit a query to the state server responsive to receipt of the phone call and wherein the telephony server is further operable to provide the selected messaging service to the mobile station.

14. The system of claim 13, wherein the messaging service comprises playing a selected voice message.

15. The system of claim 13, wherein the messaging service comprises recording a voice message.

16. The system of claim 13, wherein the messaging service comprises providing a vocalized version of an e-mail message.

* * * * *